United States Patent [19]

Rao

[11] Patent Number: 5,225,291
[45] Date of Patent: * Jul. 6, 1993

[54] DEFERRED ACTUATED BATTERY ASSEMBLY

[75] Inventor: Bhaskara M. L. Rao, Flemington, N.J.

[73] Assignee: Alupower, Inc., Warren, N.J.

[ * ] Notice: The portion of the term of this patent subsequent to Mar. 20, 2007 has been disclaimed.

[21] Appl. No.: 609,769

[22] Filed: Nov. 7, 1990

[51] Int. Cl.[5] .............................................. H01M 6/48
[52] U.S. Cl. .......................................... 429/51; 429/6; 429/72; 429/81; 429/118; 429/119
[58] Field of Search ................... 429/119, 118, 81, 72, 429/51, 6

[56] References Cited

U.S. PATENT DOCUMENTS

| | | | |
|---|---|---|---|
| 3,462,309 | 8/1969 | Wilson | 429/119 |
| 4,020,247 | 4/1977 | Birt et al. | 429/119 |
| 4,185,143 | 1/1980 | Birt et al. | 429/119 |
| 4,822,698 | 4/1989 | Jackovitz et al. | 429/119 X |
| 4,910,102 | 3/1990 | Rao et al. | 429/118 X |
| 4,910,104 | 3/1990 | Rao et al. | 429/118 X |

*Primary Examiner*—Karl Group
*Attorney, Agent, or Firm*—Louis E. Marn

[57] ABSTRACT

There is disclosed an improved deferred actuated battery assembly including a plurality of electrochemical cells comprised of a hybrid cathode member and an anode member formed of a material selected from the group consisting of aluminum, magnesium, aluminum alloys, magnesium alloys and mixtures thereof attached to an inert intermediate dielectric layer or member and configured for gross electrolyte contact therebetween disposed between an anode plate and a cathode plate.

7 Claims, 1 Drawing Sheet

DEFERRED ACTUATED BATTERY ASSEMBLY

BACKGROUND OF THE INVENTION

1. Field of the Invention

This invention relates to a deferred actuated batteries, and more particularly to an improved deferred actuated battery assembly including an electrochemical cell having a hybrid cathode.

2. Description of the Prior Art

Battery requirements for marine data systems vary from a few milliwatts for CMOS instrumentation to several tens of kilowatts for the operation of a mini autonomous underwater vehicle (AUV). Nonaqueous lithium cells and zinc-based primary cells, as well as nickel-cadmium and lead-acid batteries, are currently used. Safety and the corrosive nature of the electrolyte and/or some cathode materials used in such power sources dictate that cells and batteries be well sealed to prevent leakage and/or rupture during storage and use. Lithium batteries use hermetic seals with safety vents and a fuse. Alkaline cells are rendered leakproof by suitable double crimp joints. Lead-acid cells use a gelled electrolyte to prevent spillage of the electrolyte. Such techniques have minimized the hazards of handling and use, however at the expense of the costs. Sealed cells require a "pressure hull" enclosure for deep sea application and thus use of a pressure hull significantly reduces energy density and concomitantly increases usage cost. Other types of power cells used in undersea applications are water activated magnesium batteries with a bipolar configuration as open cells. A magnesium anode and a metal halide-based cathode allows the use of sea water as the electrolyte and do not require a pressure hull housing for deep sea applications.

Deferred actuated batteries, such as silver chloride-magnesium batteries using sea water as an electrolyte have been used for years, and are expensive being based upon the use of a precious metal, i.e. silver. Subsequent developments centered on non-silver containing sea water actuated batteries, e.g. U.S. Pat. No. 3,462,309 to Wilson based upon a magnesium anode-inert metal cathode type of a serial flow type configuration provided limited usages as well as extensive electrical circuitry including tunnel diode inverters to provide useful voltage levels. In U.S. Pat. No. 4,185,143 to Brit et al., there is disclosed a water actuated battery based upon metal/organo halogen couples having anode and cathode members of planar form with a porous insulating member sandwiched therebetween where the cell is provided with electrolyte access passageways extending around the periphery of the cathode member whereby electrolyte flowing in the passageway access the whole peripheral edge region of the cathode reactant material.

In U.S. Pat. No. 4,910,104, assigned to the same assignee as the present invention, there is disclosed a deferred actuated battery assembly comprised of a plurality of bipolar electrodes disposed between an inert cathode current collector acting as a hydrogen electrode and an anode plate formed of a material selected from the group consisting of aluminum, magnesium, aluminum alloys, magnesium alloys and mixtures thereof and configured for electrolyte flow therebetween. While such battery assembly has provided in a battery system improved capacity, longer shelf life, etc., there is always the desire to improve any such battery system, particularly with respect to current density.

In U.S. Pat. No. 4,910,102, assigned to the same assignee as the present invention, there is disclosed a deferred actuated battery assembly configured for hydrogen peroxide-containing electrolyte flow. Thus, the battery systems for marine duty are generally based upon dissolved oxygen in the seawater (DOS) as the cathode active material, e.g. magnesium/copper cells developed for underwater electrochemical power source. The concentration of DOS is about 6 ml. of dissolved oxygen per liter at the ocean surface and decreasing to low values (less than 1.5 ml. of dissolved oxygen per liter) depending on the depth and geographical location. Magnesium/copper cells fail to operate at such a low level concentration of DOS and to overcome such limitation, lead-acid battery systems are provided as back-up. Any back-up battery system has limited service-life, requires recharging, expensive pressure-hull housing as well as presents an increasing risk of explosion hazard due to hydrogen accumulation.

OBJECTS OF THE PRESENT INVENTION

An object of the present invention is to provide an improved deferred actuated battery assembly for marine use.

Yet another object of the present invention is to provide an improved deferred actuated electrochemical battery assembly for activation by seawater as the electrolyte.

Still another object of the present invention is to provide an improved deferred actuated electrochemical battery assembly capable of operating in the presence or absence of dissolved oxygen in a seawater electrolyte.

A still further object of the present invention is to provide an improved deferred actuated electrochemical battery assembly for service as a high powered, long life seawater battery.

SUMMARY OF THE INVENTION

These and other objects of the present invention are achieved by an improved deferred actuated battery assembly including a plurality of electrochemical cells comprised of a hybrid cathode member and an anode member formed of a material selected from the group consisting of aluminum, zinc magnesium, aluminum alloys, magnesium alloys zinc alloys and mixtures thereof attached to an inert intermediate dielectric layer or member and configured for gross electrolyte contact therebetween disposed between an anode plate and a cathode plate.

BRIEF DESCRIPTION OF THE DRAWINGS

Further objects and advantages of the present invention will become apparent from the following detailed description when taken with the accompanying drawing, wherein.

DETAILED DESCRIPTION OF THE INVENTION

In copending application U.S. Ser. No. 07/609,787, filed Nov. 7, 1990, there is disclosed a novel electrochemical cell comprised of an anode plate member and a cathode plate member separated by inert dielectric intermediate layer vice electrolytic gap, hereby incorporated by reference.

Figure 1:
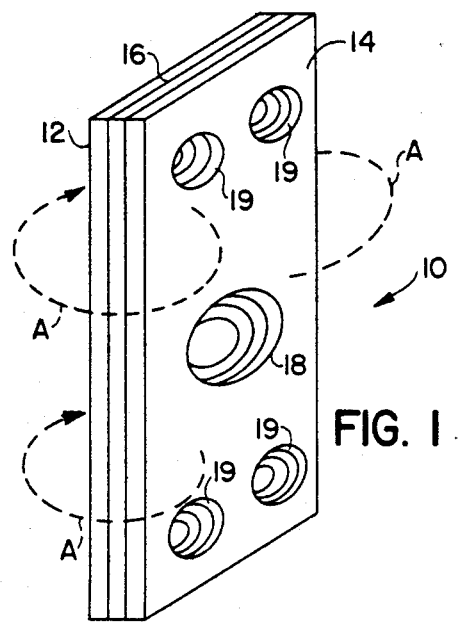
FIG. 1 is an isometric view of an electrochemical cell including hybrid cathode for the present invention.

Referring now to the drawings and particularly FIGS. 1, there is illustrated an electrochemical cell generally indicated as 10, comprised of an anode plate or member 12 and a hybrid cathode plate or member 14 mounted to an intermediate layer or member 16 formed of a dielectric material, such as any conventional plastic material suitable for battery usage, exhibiting a volume resistivity of at least about 1000 ohm×cm.

The anode plate or member 12 is formed of an aqueous stable material selected from the group consisting of aluminum, magnesium, aluminum alloys, magnesium zinc alloys zinc alloys and mixtures thereof. The dimension including thickness of the anode plate or member 12 is a function of capacity, e.g. 2 mil. foil providing for low capacity (AH 1 sq.in.) electrodes or a thickenss approaching 2 feet for high capacity.

The hybrid cathode plate or member 14 is formed of a material exhibiting inertness (low corrosion), such as nickel, stainless steel, titanium, graphite, carbon, etc. suitably subjected to catalytic activation. The term "hybrid cathode" is used in the sense that cathode half-cell reactions of water to hydroxide ions or water/oxygen to hydroxide ions may be effected as more fully hereinafter discussed.

The electrolyte is seawater with or without dissolved oxygen, i.e. the electrochemical cell suitably between an operation is seawater with dissolved oxygen in accordance with the following cell reactions 1, 2, and 3, or seawater in the absence of oxygen in accordance with the following cell reactions 1, 4 and 5.

$$Al + 3e^- \text{---} Al^{+3} + 3e^- \quad (1)$$

$$O_2 + 2H_2O + 4e^- \text{---} 4(OH)^- \quad (2)$$

$$4Al + 6H_2O + 3O_2 \text{---} 4Al(OH)_3 \quad (3)$$

$$2H_2O + 2e^- \text{---} 2(OH)^- + H_2 \quad (4)$$

$$2Al + 6H_2O \text{---} 2Al(OH)_3 + 3H_2 \quad (5)$$

The hybrid electrochemical cell 10 of the present invention is two cells in one and is an open system using seawater as the electrolyte without requiring pressure-hull housing. Thus, in a battery assembly configuration as more fully hereinafter described, the battery is activated by employment or immersion into the ocean or saltwater. Generally, the switching between an oxygen reversibly and automatically, except for delay in desorbing absorbed hydrogen from the hybrid cathode.

As hereinabove mentioned, the hybrid cathode formed electrochemical cell 10 is subjected to bulk electrolyte contact thereby establishing electrolytic path around the electrode plate without significant IR-loss due to low current density operation of the cell. Formulation of aluminum hydroxide does not clog the cell since there is free flow about the cell. To facilitate such bulk electrolyte contact, the cell 10 may be provided with a centrally-disposed large orifice or hole 18 or a plurality of peripherally-disposed orifices or hole 19 extending completely through the electrochemical cell 10 to improve performance of large area electrodes by reducing electrolyte path length between the electrodes. Generally, there is no preferred configuration of orifice disposition with a positioning being a function to achieve effective bulk electrolyte contact.

Figure 2:
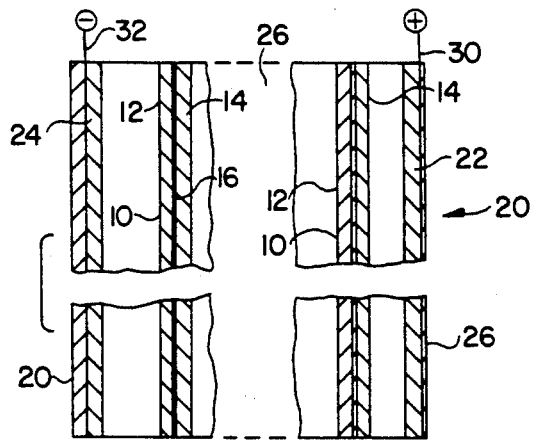
FIG. 2 is a cross-sectional elevational view of a deferred actuated battery assembly employing electrochemical cells having a hybrid cathode.

Referring now to FIG. 2, there is illustrated a battery assembly, generally indicated as 20, comprised of a plurality of electrochemical cell 10 disposed between an anode plate 22 and an inert cathode current collector plate 24 held in paralleledly-disposed spaced-apart relationship by side walls 26 formed of a dielectric material, such as any conventional plastic material suitable for battery usage. Generally, spacing between adjacent electrochemical cell 10 is not greater than about 0.5 inches to provide an adequate internally-connected series configuration.

There being no top and bottom wall member, the battery assembly 20 permits the introduction as well as flow-through of an electrolyte from top to bottom, or alternately from bottom-to-top, etc., through the spaces between the component parts thereof. The anode and cathode plates 22 and 24 are coated on an outer surface thereof with a dielectric material such as that of the side walls 26 forming anode end wall 28 and cathode end wall 30. The anode plate 22 and cathode plate 14 are provided with connector elements 30 and 32 for connection to a suitable user article or assembly, such as a light, motor, or the like.

EXAMPLE OF THE INVENTION

Operation of the process and apparatus of the present invention is illustrated by the following example which is intended to be merely illustrative and the invention is not to be regarded as limited thereto.

EXAMPLE

Electrochemical cell of the present invention is fabricated from an aluminum plate of an area of 17.5 cm.$^2$ and a thickness of 0.05 cm. attached to an intermediate dielectric plastic sheet of an area of 17.5 cm.$^2$ and a thickness of 0.01 cm. catalyzed in an 80% polladium chloride/20% platinum chloride solution attached to the other side of the plastic sheet. The cell with appropriate electrical connections to the aluminum plate and catalyzed nickel foil is immersed in a dissolved oxygen containing seawater solution and discharged across a variable resistor.

Figure 3:
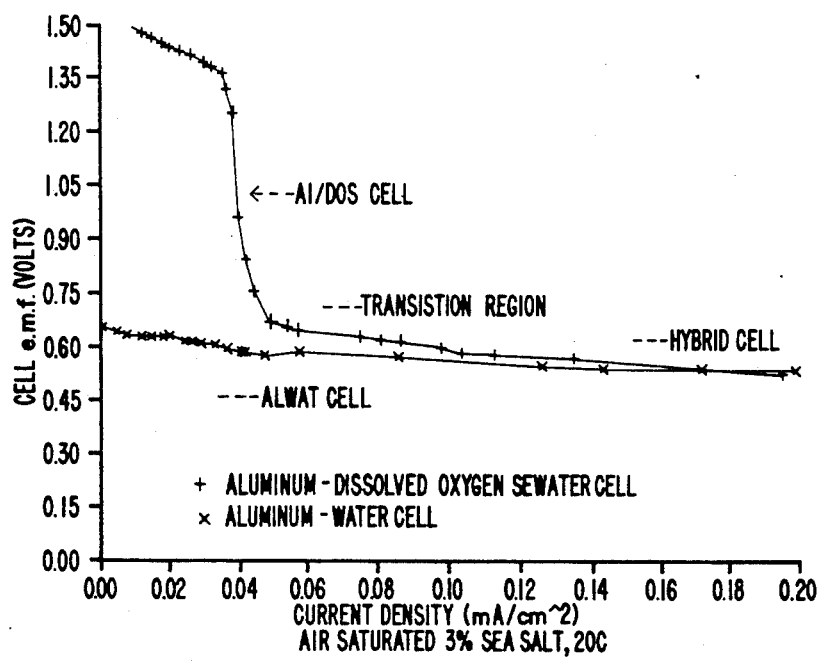
FIG. 3 is a graph illustrative of the voltage vs. current density relationship of the electrochemical cell of the present invention.

FIG. 3 illustrates the performance of the cell with about 50 microampers/cm.$^2$ being about the limiting current for dissolved oxygen as achieved by the sudden drop of cell voltage due to concentration. Upon further discharge, the non-oxygen based cell reactions are observed with cell voltage holding at about 0.5 v. With decrease in current below a limiting current, the oxygen based cell reactions are activated with concomitant high voltages.

While the present invention has been described in connection with exemplary embodiments thereof, it will be understood that many modifications will be apparent to those of ordinary skill in the art; and that this application is intended to cover any adaptations of variations thereof. Therefore, it is manifestly intended that this invention be only limited by the claims and the equivalents thereof.

What is claimed is:

1. An improved deferred actuated battery assembly, which comprises:
    an anode plate formed of a material selected from the group consisting of aluminum, magnesium, zinc, aluminum alloys, magnesium alloys, zinc alloys and mixtures thereof;

an inert cathode current collecting plate functioning as a hydrogen electrode; and a plurality of spaced-apart electrochemical cells comprised of an anode member attached to one side of a non-porous dielectric layer and a hybrid cathode member attached to another side of said non-porous dielectric layer, said anode member formed of a material selected from the group consisting of aluminum, magnesium, zinc, aluminum alloys, magnesium alloys, zinc alloys and mixtures thereof, said non-porous dielectric layer having a volume resistivity of at least about 1000 ohm.×cm.

2. The improved deferred actuated battery assembly as defined in claim 1 wherein at least one of said electrochemical cells are provided with at least one orifice extending through said electrochemical cell.

3. The improved deferred actuated battery assembly as defined in claim 2 wherein said orifice of said electrochemical cell is centrally-disposed.

4. The improved deferred actuated battery assembly as defined in claim 3 and further including a plurality of orifices extending through said electrochemical cells and about said centrally-disposed orifice.

5. The improved deferred actuated battery assembly as defined in claim 1 wherein said dielectric layer of said electrochemical cells is of a thickness of at least about 0.05 mils.

6. The improved deferred actuated battery assembly as defined in claim 1 wherein said dielectric layer of said electrochemical cells is of a thickness of from 0.05 to 100 mils.

7. The improved deferred actuated battery assembly as defined in claim 1 and further including a plurality of orifices extending thrugh said electrochemical cells.

* * * * *